(12) United States Patent
Jang

(10) Patent No.: US 9,020,514 B2
(45) Date of Patent: Apr. 28, 2015

(54) MULTI-CELL NETWORK INCLUDING COMMUNICATION DEVICE SCHEDULING OUTER CELL FREQUENCY RESOURCE AND METHOD FOR SAME

(75) Inventor: Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 889 days.

(21) Appl. No.: 12/708,653

(22) Filed: Feb. 19, 2010

(65) Prior Publication Data

US 2010/0210276 A1    Aug. 19, 2010

(30) Foreign Application Priority Data

Feb. 19, 2009    (KR) .................. 10-2009-0013905

(51) Int. Cl.
*H04W 72/00*    (2009.01)
*H04W 72/04*    (2009.01)
*H04W 16/30*    (2009.01)
*H04W 72/12*    (2009.01)

(52) U.S. Cl.
CPC .......... *H04W 72/0433* (2013.01); *H04W 16/30* (2013.01); *H04W 72/00* (2013.01); *H04W 72/1205* (2013.01)

(58) Field of Classification Search
USPC ........... 455/424, 425, 450, 550.1, 452.2, 477; 370/329, 343, 480
See application file for complete search history.

(56) References Cited

U.S. PATENT DOCUMENTS

| | | | | |
|---|---|---|---|---|
| 5,574,971 A | * | 11/1996 | Aihara | 455/441 |
| 5,758,090 A | * | 5/1998 | Doner | 709/236 |
| 5,953,661 A | | 9/1999 | Schwinghammer et al. | |
| 2004/0097238 A1 | * | 5/2004 | Hwang et al. | 455/447 |
| 2007/0077934 A1 | * | 4/2007 | Chindapol et al. | 455/447 |
| 2007/0086406 A1 | | 4/2007 | Papasakellarious | |
| 2007/0248045 A1 | * | 10/2007 | Nagaraj | 370/329 |
| 2008/0089278 A1 | * | 4/2008 | Chang et al. | 370/329 |
| 2009/0291692 A1 | * | 11/2009 | Kazmi et al. | 455/452.2 |
| 2011/0098055 A1 | * | 4/2011 | Kwon et al. | 455/452.2 |

FOREIGN PATENT DOCUMENTS

| | | |
|---|---|---|
| JP | 2001-211189 A | 8/2001 |
| JP | 2008-131087 A | 6/2008 |
| KR | 10-2004-0041009 | 5/2004 |
| KR | 10-2005-0115077 | 12/2005 |
| KR | 10-2007-0021914 | 2/2007 |
| KR | 10-2007-00293 57 A | 3/2007 |
| KR | 10-2007-0027468 | 3/2007 |
| WO | WO 2007/107207 A1 | 9/2007 |

OTHER PUBLICATIONS

Korean Office Action issued Feb. 17, 2015 in counterpart Korean Patent Application No. 10-2009-0013905 (12 pages, in Korean with partial English Translation).

* cited by examiner

*Primary Examiner* — Mahendra Patel
(74) *Attorney, Agent, or Firm* — NSIP Law

(57) ABSTRACT

A communication device, base station, terminal, and method for a multi-cell network include a scheduler configured to generate outer cell scheduling information by scheduling outer cell frequency resources for outer terminals in outer cells of a plurality of cells, and a scheduling information provider configured to provide the outer cell scheduling information to the plurality of cells.

36 Claims, 11 Drawing Sheets

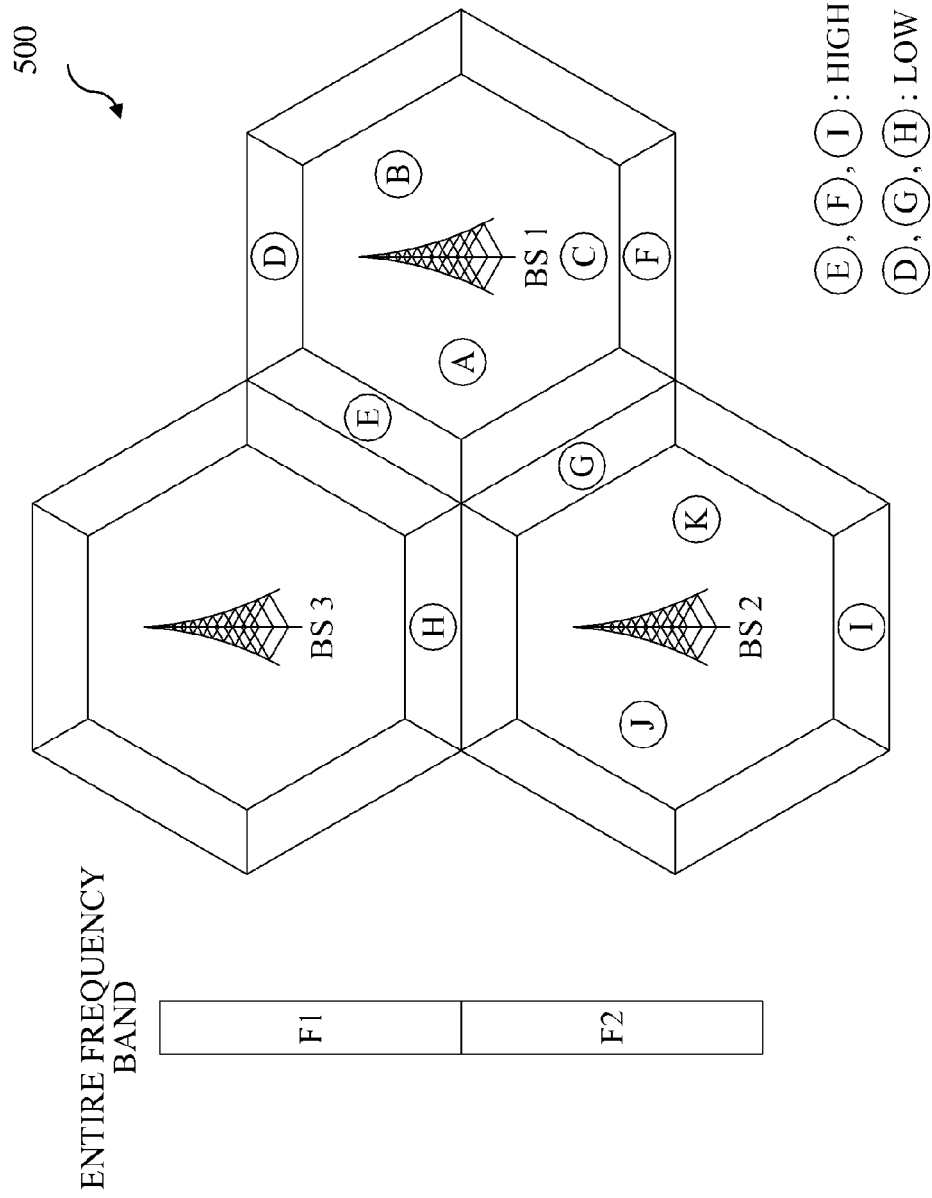

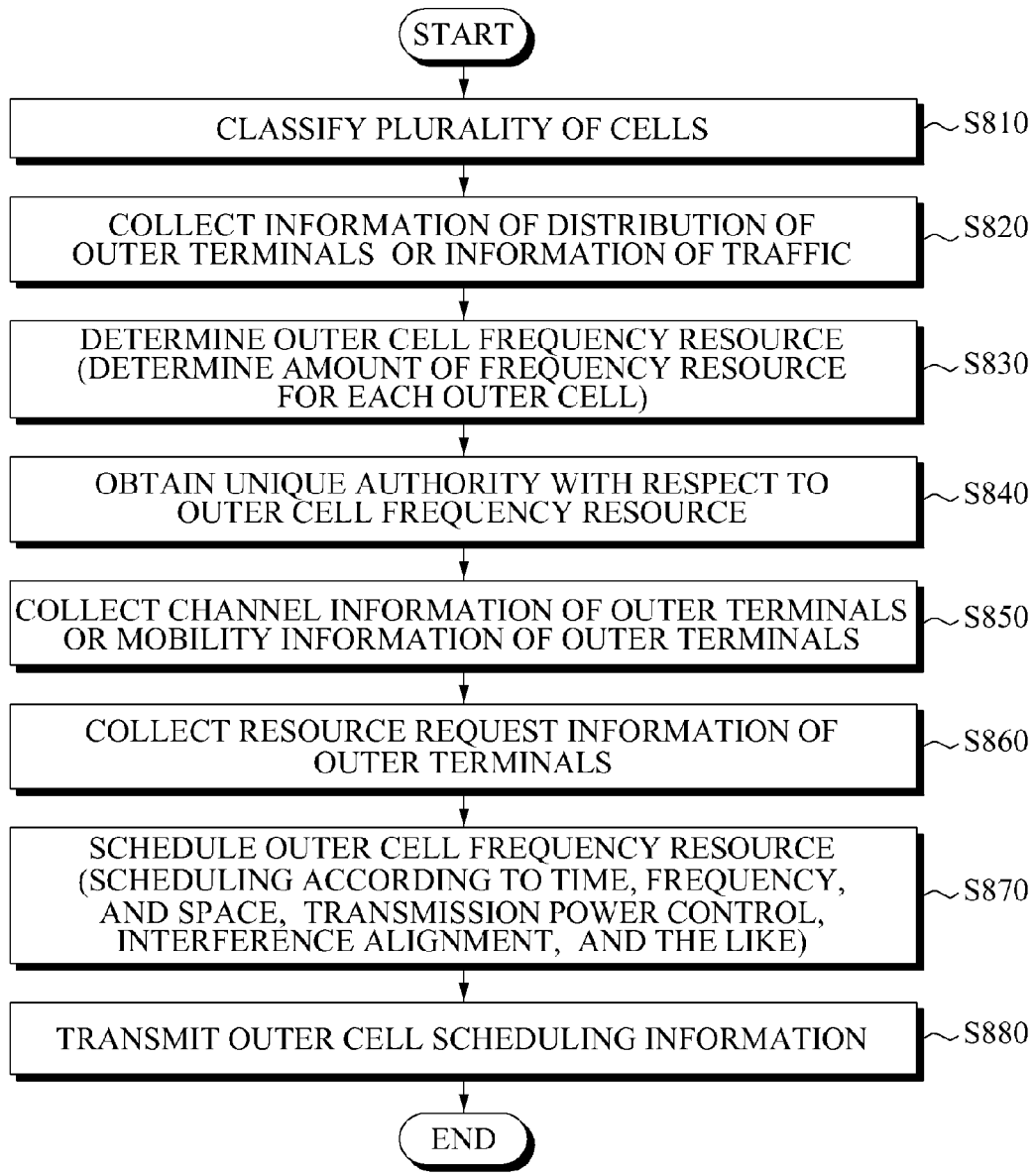

MULTI-CELL NETWORK INCLUDING COMMUNICATION DEVICE SCHEDULING OUTER CELL FREQUENCY RESOURCE AND METHOD FOR SAME

CROSS-REFERENCE TO RELATED APPLICATION(S)

This application claims the benefit under 35 U.S.C. §119(a) of a Korean Patent Application No. 10-2009-013905, filed on Feb. 19, 2009, in the Korean Intellectual Property Office, the entire disclosure of which is incorporated herein by reference for all purposes.

BACKGROUND

1. Field

The following description relates to a scheduling technology, and additionally, to a technology of scheduling a radio resource and a scheduling technology that is applicable to a multi-cell network.

2. Description of Related Art

Recently, interest in a multi-cell network including a plurality of cells has increased. Inter-cell interference may affect throughput of a network in the multi-cell network, and various proposals have been researched to solve inter-cell interference have been performed. Particularly, inter-cell interference usually occurs in outer terminals respectively disposed in outer cells of a plurality of cells.

It is important to efficiently use the radio resource while preventing inter-cell interference from occurring in the outer terminals. As an example, when different radio resources are respectively assigned to outer cells, inter-cell interference rarely occurs in the outer cells. However, in that case, the radio resources may not be effectively used. As an example, when frequency resources F1, F2, and F3 are respectively assigned and fixed to a first outer cell, a second outer cell, and a third outer cell, and a number of outer terminals respectively disposed in the first outer cell, the second outer cell, and the third outer cell is small, the assignment may waste the frequency resources.

Example of Fractional Reuse Method Defined in WiMAX Standard

FIG. 1 is a diagram illustrating a multi-cell network assigning frequency resources to outer cells and inner cells in a related art. Referring to FIG. 1, the multi-cell network includes a plurality of cells 110, 120, and 130, and the plurality of cells 110, 120, and 130 includes base stations BS1, BS2, and BS3, respectively. In this example, each of the plurality of cells 110, 120, and 130 is divided into an inner cell and at least one outer cell based on a distance to a corresponding base station BS1, BS2, or BS3.

In the multi-cell network, interference may occur in outer terminals in outer cells. There may be various methods that may minimize inter-cell interference occurring in the outer terminals, and improve spectral efficiency where a frequency resource usable by the multi-cell network is limited.

It is presumed that total frequency resources usable by the multi-cells network is F1, F2, and F3. In one example, according to the fractional reuse method defined in the WiMAX Standard, to reduce inter-cell interference, the total frequency resource F1+F2+F3 is assigned for each inner cell, and a portion of the total frequency resource is assigned for outer cells. That is, F1 is assigned to an outer cell of the cell 110, F2 is assigned to an outer cell of the cell 120, and F3 is assigned to an outer cell of the cell 130.

According to the fractional reuse method, since each of the inner cells may use all the total frequency resource, a frequency reuse rate of the inner cells may be maximized.

However, since the fractional reuse method does not consider an amount of traffic occurring in the outer cells, quality of service utilized by the outer cells, and a distribution of the outer terminals in the outer cells, the same amount of the frequency resources is fixedly assigned to each of the outer cells. Accordingly, the fractional reuse method may assign, to the outer cells, an excessive amount of the frequency resources when compared with resources utilized, and thereby causing a waste of the frequency resource. In addition, the fractional reuse method may assign an insufficient amount of the frequency resources than a utilized amount of the frequency resources, and thus, a service may not be appropriately provided to the outer terminals.

Also, the inner cells and the outer cells may use a common frequency resource. As an example, the inner cell and outer cell of the cell 110 may commonly use F1. In this example, the inner cell and the outer cell may use F1 at different times, and this may cause a decrease in throughput for all the cells. Particularly, the outer terminal has a relatively lower signal to noise ratio (SNR) as a length of a section of time in which the outer cell uses F1 increases, and thus, the throughput of all the cells may further decrease.

Example of Fractional Reuse Method Defined in IEEE 802.20

FIG. 2 is a diagram illustrating a multi-cell network assigning frequency resources to outer cells and inner cells in another related art. Referring to FIG. 2, according to the fractional reuse method defined in IEEE 802.20, all inner cells in a plurality of cells 210, 220, and 230 use frequency resource F1, and outer cells of the plurality of cells 210, 220 and 230 respectively use frequency resources F2, F3, and F4.

According to the fractional reuse method defined in IEEE 802.20, the frequency resources used by the outer cells and the frequency resource used by the inner cells are different from each other, and thus, although a length of a section of time in which the outer cells use the frequency resources increases, throughput of all the cells may not dramatically decrease because the outer cells and the inner cells use the different frequency resources in the same section of time.

However, the fractional reuse method defined in IEEE 802.20 also assigns fixed frequency resource to each of all the outer cells, and thus, when distribution of outer terminals in the outer cells and an amount of traffic of the outer cells is not considered, like the fractional reuse method, a frequency reuse rate may not increase. Also, since fixed frequency resources are separately assigned for outer cells, there is a burden of determining an optimal amount of frequency resources for the outer cells to maximize efficiency of an entire network.

SUMMARY

In one general aspect, according to example embodiments, there is provided a communication device for a multi-cell network, including a scheduler configured to generate outer cell scheduling information by scheduling outer cell frequency resources for outer terminals in outer cells of a plurality of cells, and a scheduling information provider to provide the outer cell scheduling information to the plurality of cells.

In one example, the scheduler may have a unique authority to schedule the outer cell frequency resource, and a plurality of base stations may have an authority to schedule inner cell frequency resource that is distinguished from the outer cell frequency resource.

For example, the scheduler may be configured to schedule the outer cell frequency resource by assigning, to the outer terminals, at least one of a time resource, a frequency resource, and a spatial resource in the outer cell frequency resource. In addition, the scheduler may be configured to generate the outer cell scheduling information to control transmission power of one of the outer terminals and a plurality of base stations included in the plurality of cells with respect to the outer terminals. Also, the scheduler may be configured to schedule the outer cell frequency resource so as to enable the outer terminal to use an interference alignment scheme.

Also, the scheduler may be configured to schedule the outer cell frequency resource to assign radio resources respectively to the outer cells based on the information with respect to the distribution of the outer terminals or the information with respect to the traffic occurring due to the outer terminals. Also, the scheduler may be configured to schedule the outer cell frequency resource for the outer terminals based on one of the channel information of the outer terminals and the mobility information of the outer terminals.

In one example, an amount of an outer cell frequency resource and a band of the outer cell frequency resource may be adjusted based on an amount of traffic occurring due to one of the outer terminals and/or a distribution of the outer terminals.

According to example embodiments, there may be provided a base station for a multi-cell network including a plurality of cells, the base station including a scheduling information receiving unit configured to receive outer cell scheduling information relating to a scheduling result from a communication device that is configured to schedule an outer cell frequency resource for outer terminals in outer cells of the base station, and a scheduler configured to generate scheduling information by scheduling inner cell frequency resource for inner terminals in an inner cell of the base station referring to the outer cell scheduling information.

According to example embodiments, there may be provided a terminal for a multi-cell network, including a scheduling information receiving unit configured to receive scheduling information from a serving base station, and a processor configured to process a received signal or to generate a transmission signal, using radio resource for a terminal, the radio resource being recognized based on the scheduling information.

In response to the communication device's generating outer cell scheduling information by scheduling an outer cell frequency resource for outer terminals in outer cells of a plurality of cells, the scheduling information is generated by scheduling of an inner cell frequency resource for inner terminals in an inner cell of the serving base station, the scheduling being performed by the service base station based on the outer cell scheduling information.

Another embodiment includes a method of operating of a communication device for a multi-cell network, the method including: generating outer cell scheduling information by scheduling an outer cell frequency resource for outer terminals in outer cells of a plurality of cells, and providing the outer cell scheduling information to the plurality of cells.

A computer computer-readable recording media may store a program implementing the method.

Another embodiment includes a method of operating of a base station for a multi-cell network, the method including: receiving outer cell scheduling information relating to scheduling result from a communication device configured to schedule outer cell frequency resources for outer terminals in an outer cell of the base station.

Other features and aspects will be apparent from the following detailed description, the drawings, and the claims.

BRIEF DESCRIPTION OF THE DRAWINGS

FIGS. 5 through 7B are diagrams illustrating examples of a distribution of outer terminals and inner terminals and examples of scheduling results.

FIG. 8 is a flowchart illustrating an example of a method of operating a communication device.

Throughout the drawings and the detailed description, unless otherwise described, the same drawing reference numerals will be understood to refer to the same elements and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. The progression of operations described is an example; however, the sequence of operations is not limited to that set forth herein and may be changed as is known in the art, with the exception of operations necessarily occurring in a certain order. Also, descriptions of well-known functions and constructions may be omitted for increased clarity and conciseness.

A multi-cell network according to example embodiments includes a communication device managing frequency resources for outer cells. Accordingly, frequency resources may be more efficiently managed.

That is, the communication device is configured to schedule frequency resources for the outer cells with respect to all outer cells so as to improve the frequency reuse rate and minimizing interference occurring among outer terminals. In this example, frequency resources for the inner cells are managed by each of a plurality of base stations included in a plurality of cells, as opposed to by the communication device. Also, the communication device may use information with respect to traffic occurring among the plurality of cells and/or among the outer cells, information with respect to a distribution of the outer terminals, channel information of the outer terminals, and the like to schedule frequency resources for the outer cells.

In a multi-cell network including the communication device according to example embodiments, in response to the communication device's scheduling the frequency resources for the outer cells by dynamically reflecting the traffic of the outer cells and/or the distribution of the outer terminals in the outer cells, the scheduling with respect to the frequency resources for the outer cells may be optimized, so as to reduce or minimize a waste of the frequency resources. Also, since a communication device independent from base stations manages the frequency resources, spectral efficiency of the outer cells may be improved by using a transmission power controlling scheme and an interference controlling scheme. This will be described below with reference to FIGS. 3 through 11.

Figure 1:
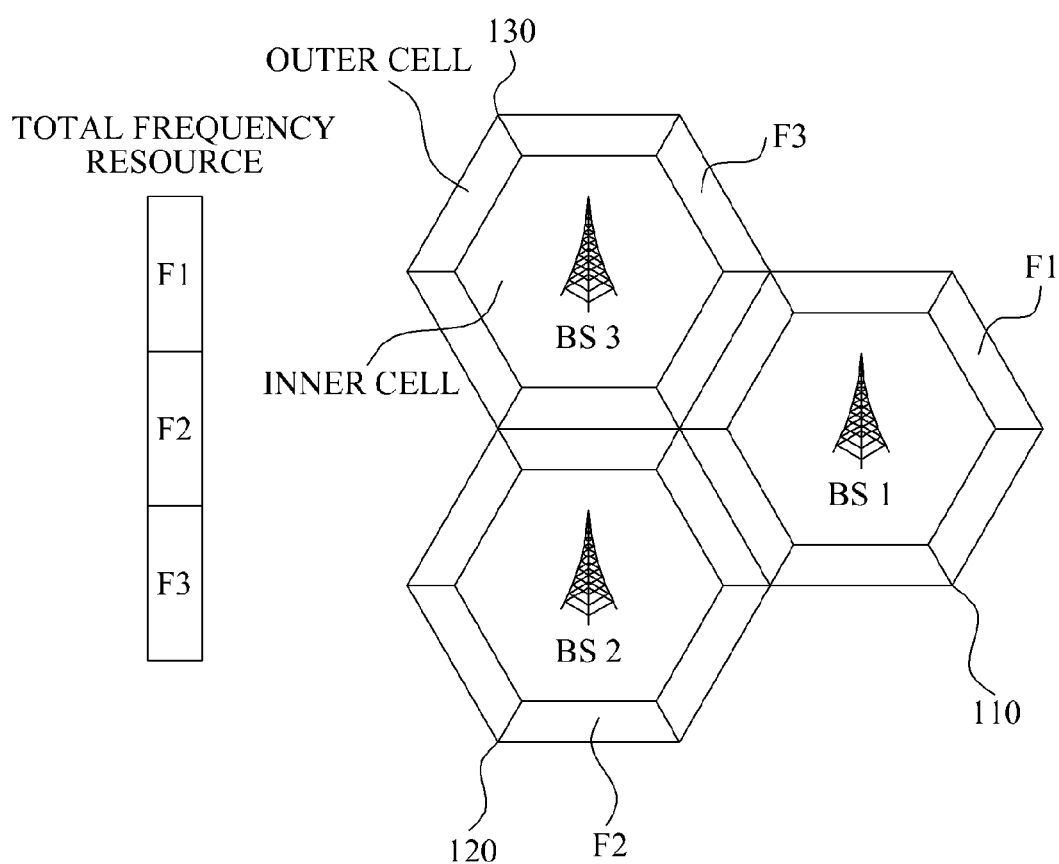
FIG. 1 is a diagram illustrating a multi-cell network assigning a frequency resource to outer cells and inner cells in a related art.
Figure 2:
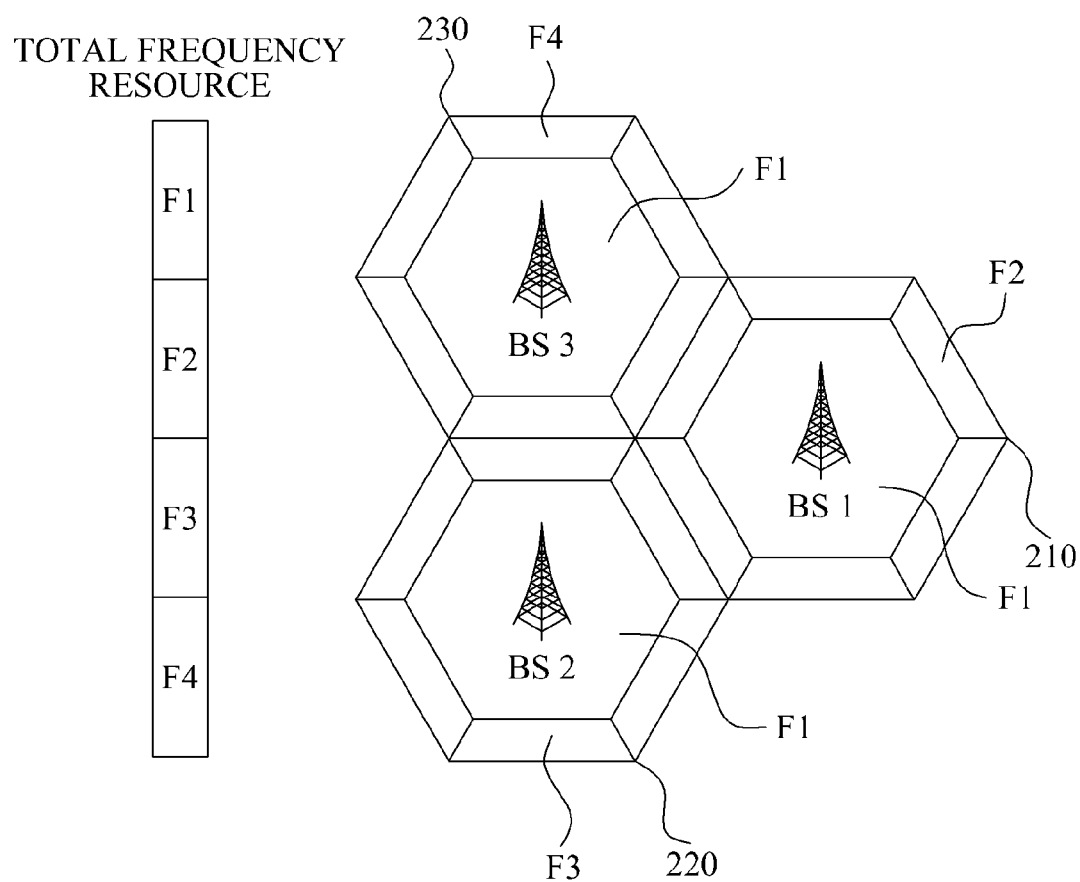
FIG. 2 is a diagram illustrating a multi-cell network assigning a frequency resource to outer cells and inner cells in another related art.
Figure 3:
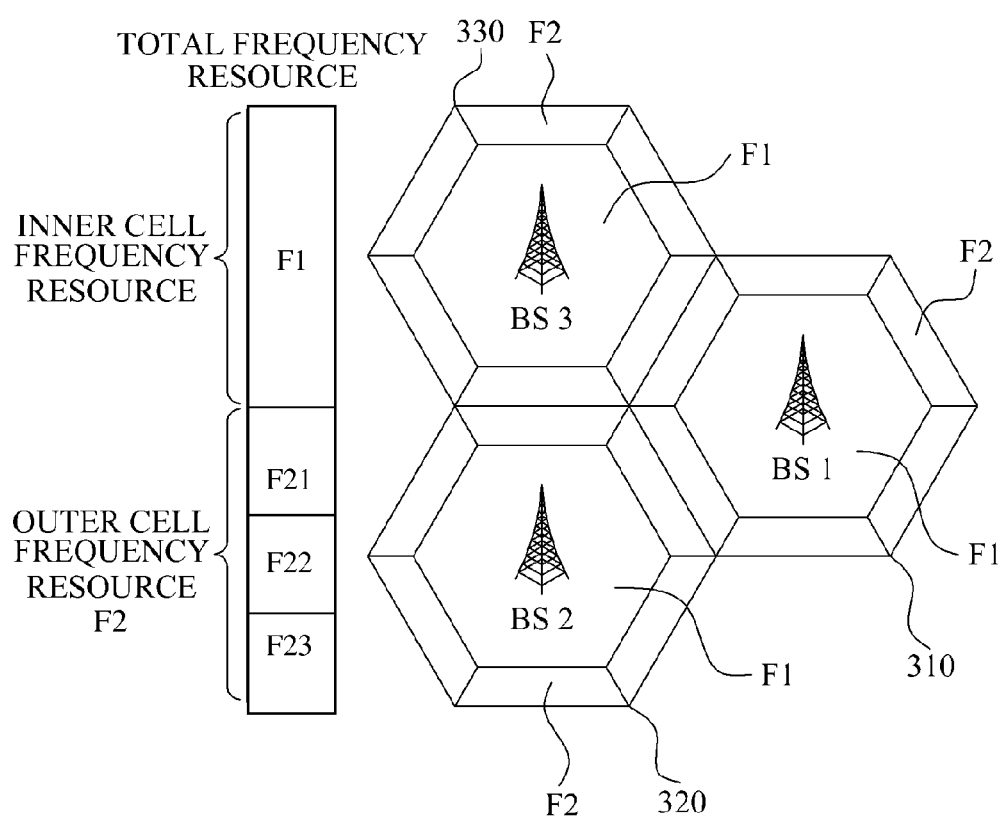
FIG. 3 is a diagram illustrating an example of a multi-cell network assigning an outer cell frequency resource for outer cells to the outer cells, and assigning inner cell frequency resources for inner cells to the inner cells.

FIG. 3 is a diagram illustrating an example of a multi-cell network assigning an outer cell frequency resource to the outer cells and inner cell frequency resources to the inner cells in accordance with an example embodiment. Referring to FIG. 3, a frequency resource F2 is assigned to the outer cells and a frequency resource F1 is assigned to the inner cells. Here, the frequency resource for the outer cells is referred to as an "outer cell frequency resource", and the frequency resource for the inner cells is referred to as an "inner cell frequency resource".

Each of a plurality of cells 310, 320, 330 is classified based on locations of respective base stations BS1, BS2, BS3. Also, outer terminals respectively included in the outer cells of the plurality of cells 310, 320, 330 are distinguished from inner terminals included in the inner cells of the plurality of cells 310, 320, 330 based on locations of the terminals and/or a strength of a signal received at the terminals.

According to example embodiments, a total frequency resource usable by the multi-cell network may be classified into the inner cell frequency resource F1 and the outer cell frequency resource F2. In one example, the outer cell frequency resource F2 is not managed by the base stations BS1, BS2, BS3, but is managed by a separate communication device (e.g., communication device 414 in FIG. 4A) that has a unique authority to schedule the outer cell frequency resource F2. Conversely, the base stations BS1, BS2, BS3 have a unique authority to schedule the inner cell frequency resource F1.

Examples of a method that the communication device may use to schedule the outer cell frequency resource include an orthogonal scheduling method, a non-orthogonal scheduling method, and the like, and the communication device may appropriately select any one of the various scheduling methods. Particularly, the communication device may discover an optimal scheduling method based on mobility information of the outer terminals and/or channel information of the outer terminals.

The communication device having the unique authority to schedule the outer cell frequency resource F2 indicates that the communication device schedules the outer cell frequency resource F2 independent of a scheduling result with respect to the inner cell frequency resource F1. Also, the communication device scheduling the outer cell frequency resource F2 indicates the communication device assigns a frequency resource, a time resource, and a spatial resource for outer terminals in the outer cell frequency resource F2 or applies an interference alignment scheme and/or a transmission power controlling scheme to the outer terminals in the outer cell frequency resource F2.

In one example, the separate communication device may be embodied in various formats. As an example, the communication device may be established at a long distance from the base stations BS1, BS2, BS3, acting as an upper node of the base stations BS1, BS2, BS3. Also, the communication device may be included in any one of the base stations BS1, BS2, BS3 or established adjacent to any one of the base stations (e.g., communication device 424 in communication with base station 421 in FIG. 4B). Related examples will be described below with reference to FIGS. 4A and 4B.

The communication device appropriately schedules the outer cell frequency resource F2 given for the outer terminals in the outer cells, decreasing interference occurring among the outer terminals. As an example, the communication device orthogonally assigns, to the outer terminals, at least one of the time resource, the frequency resource, and the spatial resource, in the outer cell frequency resource F2, decreasing the interference.

There may be various methods of assigning, by the communication device, at least one of the time resource, the frequency resource, and the spatial resource to the outer terminals.

As an example, the communication device may assign a time resource T1 and the cell frequency resource F2 to an outer cell of a cell 310, may assign a time resource T2 and the cell frequency resource F2 to an outer cell of a cell 320, and may assign a time resource T3 and the cell frequency resource F2 to an outer cell of a cell 330. Also, as an another example, when the outer cell frequency resource F2 includes sub-frequency resources F21, F22, F23, the communication device may assign a time resource T and the sub-frequency resource F21 to the outer cell of the cell 310, may assign the time resource T and the sub-frequency resource F22 to the outer cell of the cell 320, and may assign the time resource T and the sub-frequency resource F23 to the outer cell of the cell 330. There may be various examples with respect to scheduling results of the communication device.

The base stations BS1, BS2, BS3 may provide information of a distribution of the outer terminals, information of traffic occurring due to the outer terminals to the communication device. In one example, the communication device, unlike each of the base stations BS1, BS2, BS3, may collect the information of the distribution of the outer terminals in all outer cells, and the information of the traffic occurring due to the outer terminals. In this example, the communication device may provide an optimal scheduling result with respect to the outer cell frequency resource F2 by dynamically reflecting the distribution of the outer terminals in all the outer cells and the traffic occurring due to the outer terminals.

As an example, in response to a number of outer terminals' being in the outer cell of the cell 310 and/or excessive traffic occurs in the outer cell of the cell 310, the communication device may assign a large amount of the outer cell frequency resource F2 to the outer cell of the cell 310, and/or may allow the outer cell of the cell 310 to use the outer cell frequency resource F2 during a long section of time. Conversely, when the traffic occurring in the outer cell of the cell 320 is light, the communication device may assign only a small amount of the outer cell frequency resource F2 to the outer cell of the cell 320, and/or may schedule the outer cell of the cell 320 to use the outer cell frequency resource F2 during a short section of time.

Also, the communication device may schedule the outer cell frequency resource F2 by further considering the channel information of the outer terminals, e.g., signal channel information and/or interference channel information, and mobility information of the outer terminals. In one example, the channel information and the mobility information may be considered when the communication device assigns the time resource, the frequency resource, and the spatial resource to the outer cells in the outer cell frequency resource F2, and may also be considered when the communication device determines whether the transmission power controlling scheme and/or an interference alignment scheme is applied.

Also, an amount of the outer cell frequency resource F2 and/or a band of the outer cell frequency resource F2 may be adjusted. As an example, the communication device may negotiate with the plurality of base stations BS1, BS2, BS3 by comprehensively considering an amount of frequency resource utilized by the outer cells, a band (utilized by the outer cells), a level of a service quality, a distribution of outer terminals, an amount of traffic occurring due to the outer terminals, and the like, so as to determine the amount of the outer cell frequency resource F2 and/or the band of the outer cell frequency resource F2.

As an example, when an amount of the traffic occurring in all the outer cells is excessively small, the amount of the outer cell frequency resource F2 may decrease. In addition, since generally a SNR decreases in a high frequency band, the band of the outer cell frequency resource F2 is determined to be the high frequency band when an amount of the traffic occurring in all the outer cells is excessively small.

"Outer cell scheduling information" relating to a scheduling result with respect to the outer cell frequency resource F2 of the communication device is provided to the base stations BS1, BS2, BS3. In one example, the base stations BS1, BS2, BS3 may communicate with outer terminals while referring to the outer cell scheduling information. Conversely, the base stations BS1, BS2, BS3 may perform scheduling with respect to inner cell frequency resource F1 by themselves, and may communicate with inner terminals according to their scheduling result. Therefore, the base stations BS1, BS2, BS3 may serve the outer terminals according to the scheduling result with respect to the outer cell frequency resource F2 of the communication device, and may serve the inner terminals according to their own scheduling result with respect to the inner cell frequency resource F1.

In one example, the outer cell scheduling information may include information with respect to the frequency resource, the time resource, and the spatial resource that are respectively assigned to the outer terminals, in the outer cell frequency resource. In addition, the outer cell scheduling information may include information of whether the interference alignment scheme and/or the transmission power controlling scheme is applied to the outer cells, and information of various parameters utilized for using the interference alignment scheme and/or the transmission power controlling method.

Figure 4A:
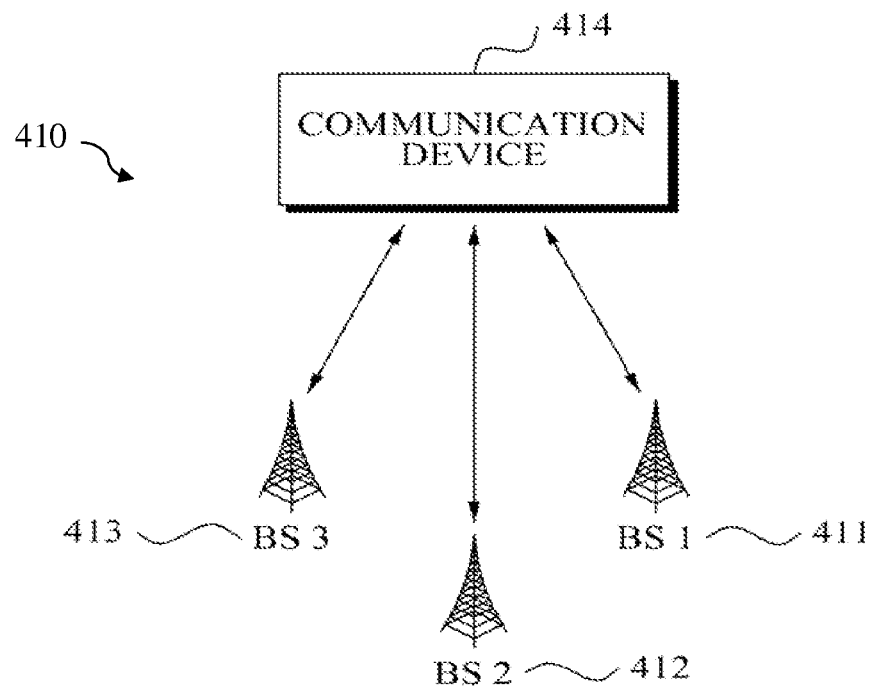
FIG. 4A is a diagram illustrating a communication device established as a separate node from base stations.
Figure 4B:
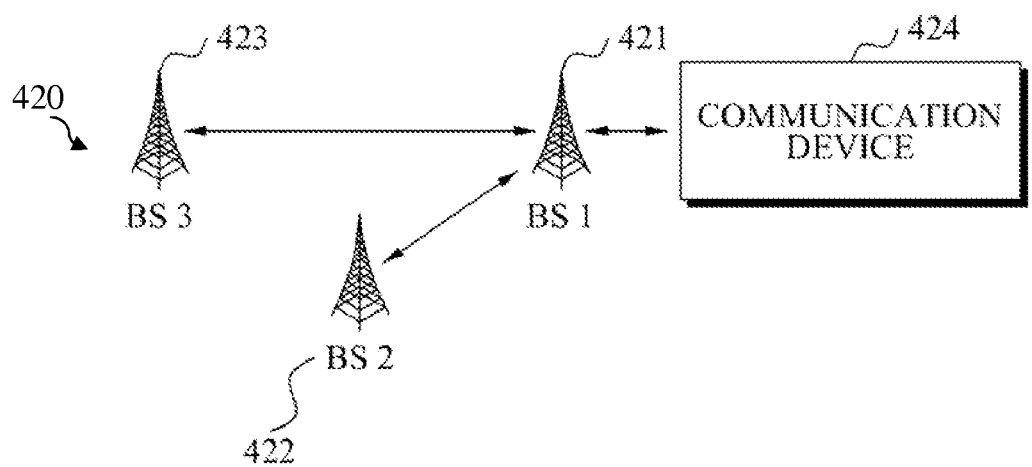
FIG. 4B is a diagram illustrating a communication device established together with a base station as examples of communication devices.

FIG. 4A illustrates a communication device established as a separate node from base stations. FIG. 4B illustrates a communication device established together with a base station as examples of communication devices.

FIG. 4A depicts a network 410 includes a communication device 414 according to example embodiments that may act as an upper node of a plurality of base stations 411, 412, and 413 (e.g., BS1, BS2, BS3). In one example, the base stations 411, 412, and 413 may report, to the communication device 414 that is the upper node, a distribution of outer terminals, traffic information occurring due to the outer terminals, channel information of the outer terminals, and the like. For example, the communication device 414 may schedule outer cell frequency resource referring to various information, and may report a scheduling result to the base stations 411, 412, and 413.

FIG. 4B depicts a network 420 includes a communication device 424 according to other example embodiments that may be included in a single base station 421 or may be established adjacent to the base station 421, as opposed to acting as an upper node of base stations 421, 422, and 423. In one example, the other base stations 422 and 423 may collect various information to transfer to the base station 421 and the communication device 424 may collect all information from the base station 421.

Figure 6:
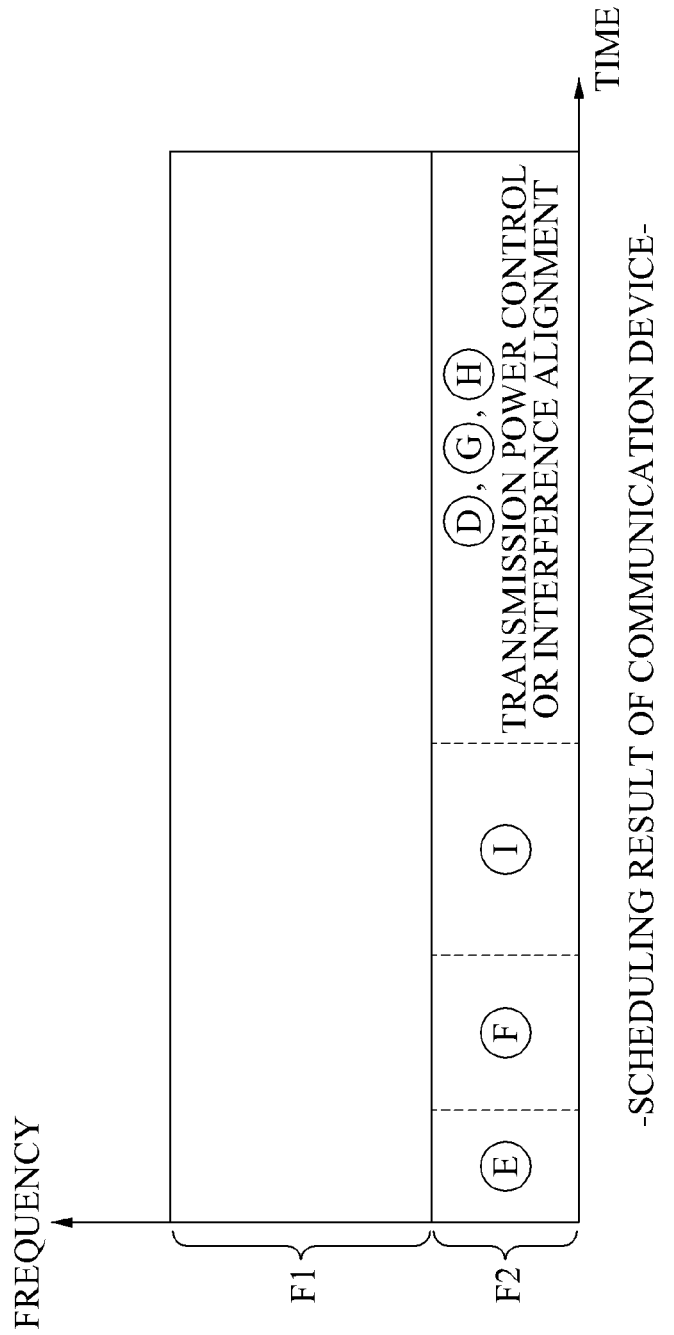

FIGS. 5 through 7 illustrate examples of a distribution of outer terminals and inner terminals and examples of scheduling results.

Referring to FIG. 5, in a network 500, an entire frequency band is classified into an inner cell frequency resource F1 for inner terminals and an inner cell frequency resource F2 for outer terminals F2. It is presumed that inner terminals A, B, and C are disposed in an inner cell of a base station BS1, and inner terminals J and K are disposed in an inner cell of a base station BS2. Also, outer terminals D, E, and F may be located in an outer cell of the base station BS1, outer terminals G and I may be located in an outer cell of the base station BS2, and outer terminal H may be located in an outer cell of the base station BS3. Also, the outer terminals E, F, and I may have a high mobility, and the outer terminals D, G, and H may have a low mobility. As a nonlimiting example, a high mobility may be about 100 km/h, while a low mobility may be about 10 km/h.

An example of the scheduling result of the communication device in the multi-cell network 500 including terminals, as illustrated in FIG. 5, will be described with reference to FIG. 6. That is, the communication device (e.g., communication device 414, 424 as depicted in FIGS. 4A and 4B) may schedule the outer cell frequency resource F2 by dynamically considering a distribution of the outer terminals (e.g., outer terminals D, E, F, G H, I), channel information of the outer terminals, a level of service quality utilized by the outer terminals, mobility information of the outer terminals, and the like. For example, the communication device may assign a greatest amount of time resource to the outer terminal I, and may assign a smallest amount of time resource to the outer terminal E. Since the communication device may perform scheduling by considering the mobility of the outer terminals, the communication device may determine to apply a transmission power controlling scheme and/or an interference alignment scheme to the outer terminals D, G and H.

The scheduling result of the communication device with respect to the outer cell frequency resource F2 is provided to the base stations BS1, BS2, BS3 as outer cell scheduling information. In this example, the outer cell scheduling information includes the various information as described above.

Each of the base stations BS1, BS2, BS3 recognizes scheduling information with respect to outer terminals D, E, F, G, H, I included in corresponding cell based on the outer cell scheduling information. That is, the base station BS1 recognizes scheduling information with respect to its outer terminals D, E, F; base station BS2 recognizes scheduling information with respect to outer terminals I, G; and the base station BS3 recognizes scheduling information with respect to outer terminal H.

Figure 7A:
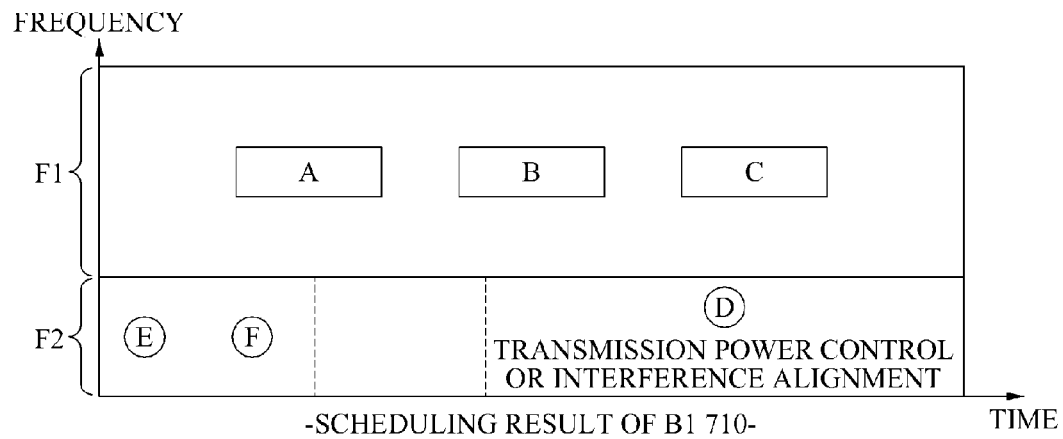

FIG. 7A illustrates an example of a scheduling result 710 of the base station BS1. Since the outer terminals included in the outer cell of the base station BS1 are its outer terminals E, F, D, the base station BS1 may extract scheduling information with respect to its outer terminals E, F, D based on the outer cell scheduling information. Also, the base station B 51 schedules the inner cell frequency resource F1 with respect to inner terminals A, B, C included in the inner cell of the base station BS1. Accordingly, it is recognized that the base station BS1 assigns different time resources to inner terminals A, B, C in the inner cell frequency resource F1.

Also, the base station BS1 may generate scheduling information with respect to all its served terminals A, B, C, D, E, F by summing up the outer cell scheduling information with respect to the outer terminals D, E, F, and the inner cell scheduling information with respect to the inner terminals A, B, C. Subsequently, the generated scheduling information may be provided to all the served terminals A, B, C, D, E, F and the base station BS1 and its served terminals A, B, C, D, E, F may perform communication according to the scheduling information.

Figure 7B:
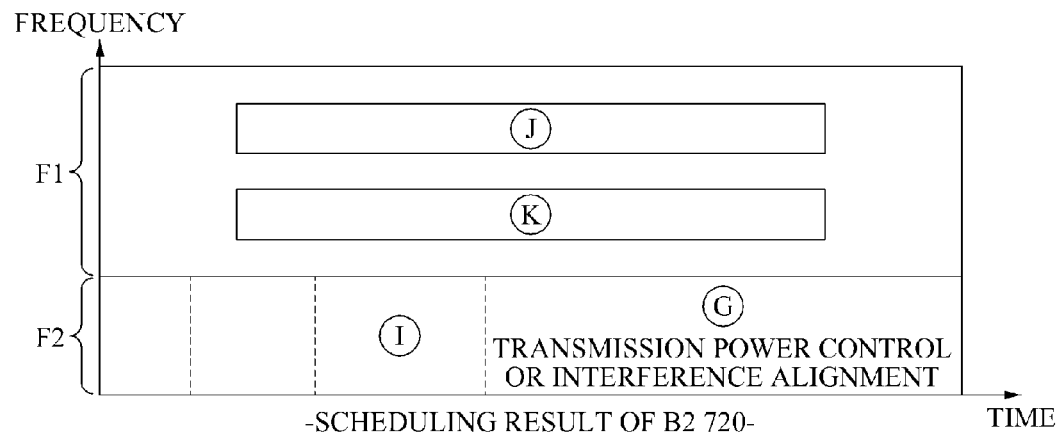

FIG. 7B depicts another example of a scheduling result 720. The base station BS2 may perform scheduling of the inner cell frequency resource F1 with respect to its inner terminals J, K in a different manner than the base station BS1. That is, the base station BS2 may divide the inner cell frequency resource F1 into two sub-frequency resources, and may assign one sub-frequency resource to the inner terminal J and the other sub-frequency resource to the inner terminal K.

Also, the base station BS2 may generate scheduling information with respect to served terminals G, I, J, K by summing up the scheduling result of the inner cell frequency resource F1 and scheduling result with respect to the outer terminals G I, and may provide the scheduling information to the served terminals G I, J, K.

An inner terminal of the base station BS3 is not in the illustrated example. However, when the inner terminal of the base station BS3 exists, although not depicted in FIGS. 7A and 7B, the base station BS3 may also be able to perform scheduling by using at least one method of various scheduling methods.

FIG. 8 is a flowchart illustrating an example of a method of operating a communication device. Referring to FIG. 8, the communication device according to example embodiments may classify a plurality of cells in operation 810. That is, the communication device may classify the plurality of cells based on locations of base stations.

Also, the communication device according to example embodiments may collect information of a distribution of outer terminals and/or information of traffic occurring due to outer terminals in operation 820. In one example, the information of the distribution of outer terminals and/or the information of traffic occurring due to the outer terminals may be provided to the communication device via each of the base stations.

Also, the communication device according to example embodiments may determine a portion of a total frequency resource as an outer cell frequency resource in operation 830. In this example, the communication device (e.g., communication device 414, 424 depicted in FIGS. 4A and 4B) may adaptively adjust an amount of the outer cell frequency resource (e.g., outer cell frequency resource F2) and/or a band of the outer cell frequency resource according to the distribution of the outer terminals (e.g., outer terminals D, E, F, G, H, I illustrated in FIG. 5) and/or traffic occurring due to the outer terminals, and may determine an amount of frequency resource for each of the outer cells.

In response to the amount of the outer cell frequency resource and/or the band of the outer cell frequency resource's being determined and the frequency resource for each of the outer cells' being determined in the outer cell frequency resource, each of the base stations may assign an authority to schedule the determined frequency resource to the communication device. Accordingly, the communication device according to example embodiments may obtain a unique authority to schedule an entire outer cell frequency resource in operation 840.

Also, the communication device according to example embodiments may collect channel information of the outer terminals and/or mobility information of the outer terminals in operation 850. Here, the channel information of the outer terminals may include information of signal channels of the outer terminals and information of interference channels.

Also, the communication device according to example embodiments may collect resource request information of the outer terminals in operation 860. That is, each of the base stations may collect the resource request information of the outer terminals and may provide the collected resource request information to the communication device.

Also, the communication device according to example embodiments may schedule the outer cell frequency resource for the outer terminals of outer cells in operation 870. In this example, the communication device may appropriately assign a time resource, a frequency resource, and/or a spatial resource to the outer terminals in the outer cell frequency resource, and may determine to apply a transmission power controlling scheme and/or an interference alignment scheme to the outer terminals.

For example, the communication device may select one of an orthogonal scheduling method or a non-orthogonal scheduling method according to the channel information of the outer terminals and/or mobility information of the outer terminals.

Also, the communication device according to example embodiments may transmit (or output) outer cell scheduling information with respect to a scheduling result to the base stations in operation 880.

In one example, the base stations may serve outer terminals according to the outer cell scheduling information. The base stations may schedule an inner cell frequency resource for inner terminals and may serve the inner terminals according to a scheduling result of the inner cell resource.

Figure 9:
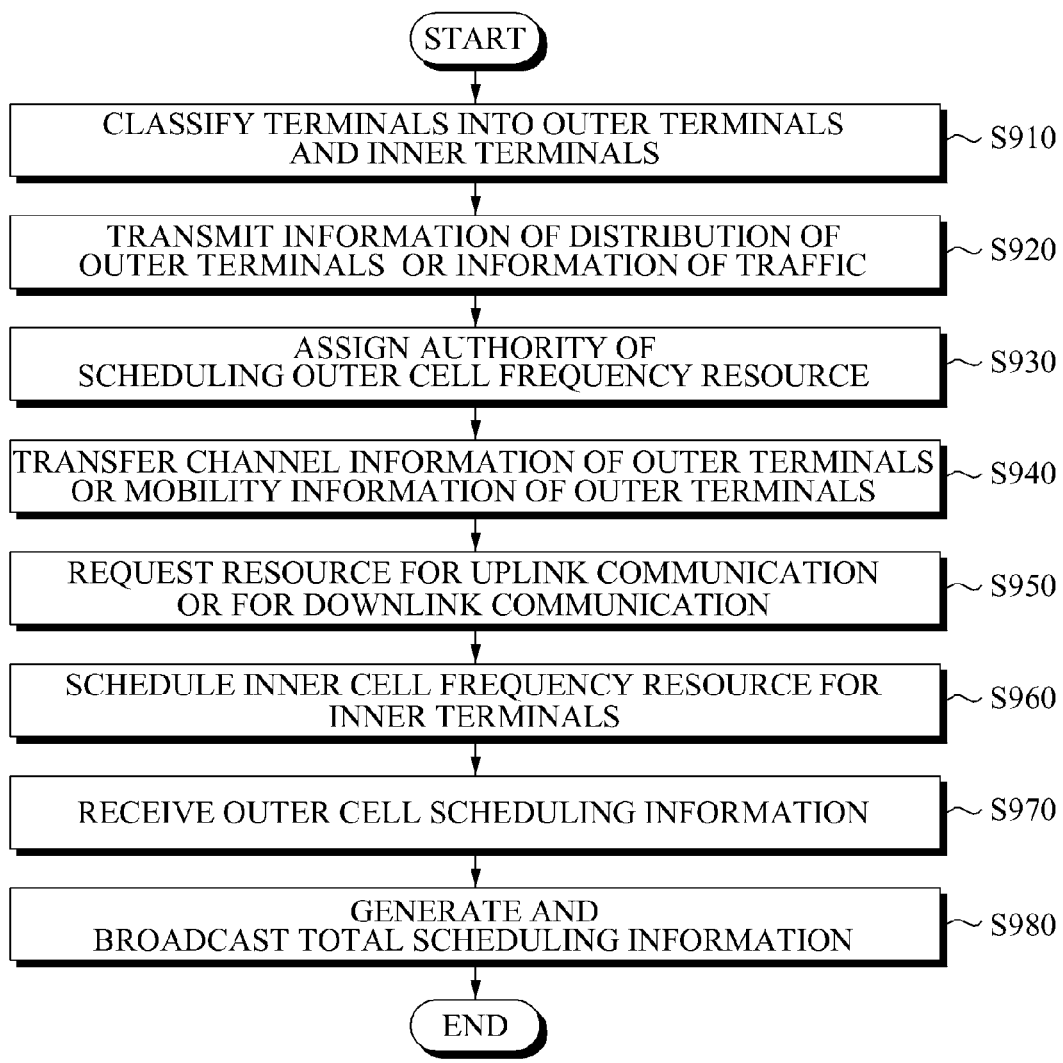
FIG. 9 is a flowchart illustrating an example of a method of operating a base station.

FIG. 9 is a flowchart illustrating an example of a method of operating a base station. Referring to FIG. 9, the base station according to example embodiments may classify terminals into outer terminals and inner terminals based on a distance between terminals in an outer cell and the base station in operation 910. An outer cell frequency resource for the outer terminals (e.g., resource F2) may be scheduled by a separate communication device (e.g., communication device 414 in FIG. 4A), and an inner cell frequency resource for the inner terminals (e.g., resource F1) may be scheduled by the base station (e.g., base station BS1, BS2, BS3). For example, the outer terminals may be selected based on locations of the outer terminals and/or a strength of a signal that is received at the terminals.

Also, the base station according to example embodiments may provide information of a distribution of the outer terminals and/or information of traffic occurring due to the outer terminals to the communication device, enabling the communication device to perform scheduling by dynamically reflecting various statuses of the outer cells in operation 920.

Also, the base station according to example embodiments may assign an authority to schedule the outer cell frequency resource to the communication device in operation 930. Conversely, the base station still retains an authority to schedule the inner cell frequency resource for the inner cells.

Additionally, the base station according to example embodiments may provide channel information of the outer terminals and/or mobility information of the outer terminals in operation 940.

Moreover, the base station according to example embodiments may transmit, to the communication device, a resource request for uplink communication or downlink communication of the outer terminals in operation 950.

In this example, the base station may generate outer cell scheduling information by scheduling the outer cell frequency resource through comprehensively considering the information of the distribution of the outer terminals and/or information of traffic occurring due to the outer terminals.

In addition, the base station according to example embodiments may schedule the inner cell frequency resource for the inner terminals in operation 960, and also may receive the outer cell scheduling information in operation 970.

Furthermore, the base station according to example embodiments may generate scheduling information for all the inner terminals and the outer terminals by adding a scheduling result with respect to the inner cell frequency resource to the outer cell scheduling information in operation 980. The scheduling information may be broadcasted to the inner terminals and the outer terminals; the base station, the inner terminals, and the outer terminals perform communication according to the scheduling information. That is, the base station may assign radio resources to each of the inner terminals and the outer terminals, respectively, in the inner cell frequency resource and the outer cell frequency resource and performs uplink communication and/or downlink communication using the assigned radio resource.

Figure 10:
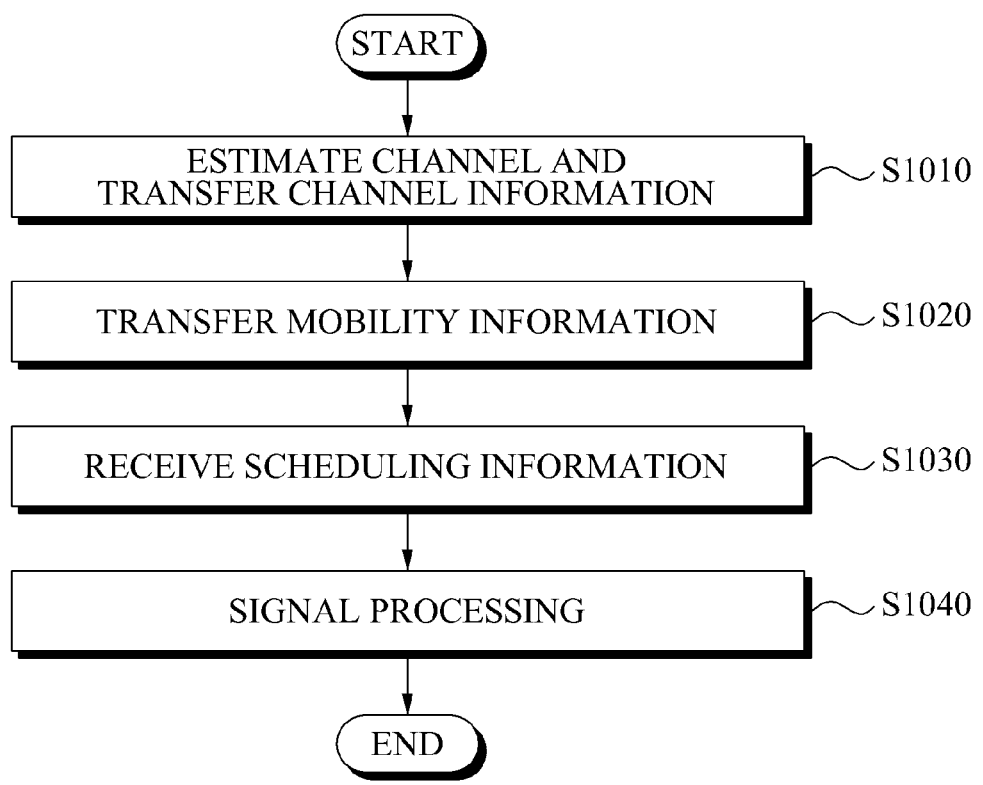
FIG. 10 is a flowchart illustrating an example of a method of operating a terminal.

FIG. 10 is a flowchart illustrating an example of a method of operating a terminal. Referring to FIG. 10, when the terminal according to example embodiments is an outer terminal (e.g., outer terminals D, E, F, G, H, I in FIG. 5), the terminal may estimate a signal channel established between a serving base station (e.g., base stations BS1, BS2, BS3 in FIG. 5) and the terminal, may estimate an interference channel established between the terminal and the other base stations adjacent to the serving base station, and may transfer information with respect to the signal channel and the interference channel, to the serving base station in operation S1010. Also, the terminal according to example embodiments transfers its own mobility information to the serving base station in operation S1020.

In this example, the serving base station may transfer, to a communication device (e.g., communication device 414, 424 in FIGS. 4A and 4B), the channel information of the terminal and the mobility information of the terminal, and the communication device may schedule an outer cell frequency resource based on the channel information of the terminal, mobility information, information of traffic of an outer cell including the terminal, and information of a distribution of terminals in the outer cell. Also, the service base station may schedule an inner cell frequency resource.

Also, the terminal according to example embodiments may receive scheduling information from the base station in operation S1030.

In addition, the terminal may recognize a radio resource assigned to the terminal itself and may perform signal processing using the recognized radio resource in operation S1040. In one example, the terminal may be an outer terminal that recognizes outer cell scheduling information based on the scheduling information, and the terminal may be an inner terminal that recognizes inner cell scheduling information based on the scheduling information.

The terminal may process a transmission signal to perform uplink communication and/or may process a reception signal to perform downlink communication, according to the recognized radio resource. For example, in response to a plurality of base stations' using an interference alignment scheme, the terminal may eliminate aligned interference from the reception signal, and may perform uplink communication using the transmission power control scheme.

The processes, functions, methods and/or software described above and other embodiments may be recorded in computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes and/or program instructions may be stored and executed in a decentralized manner.

Figure 11:
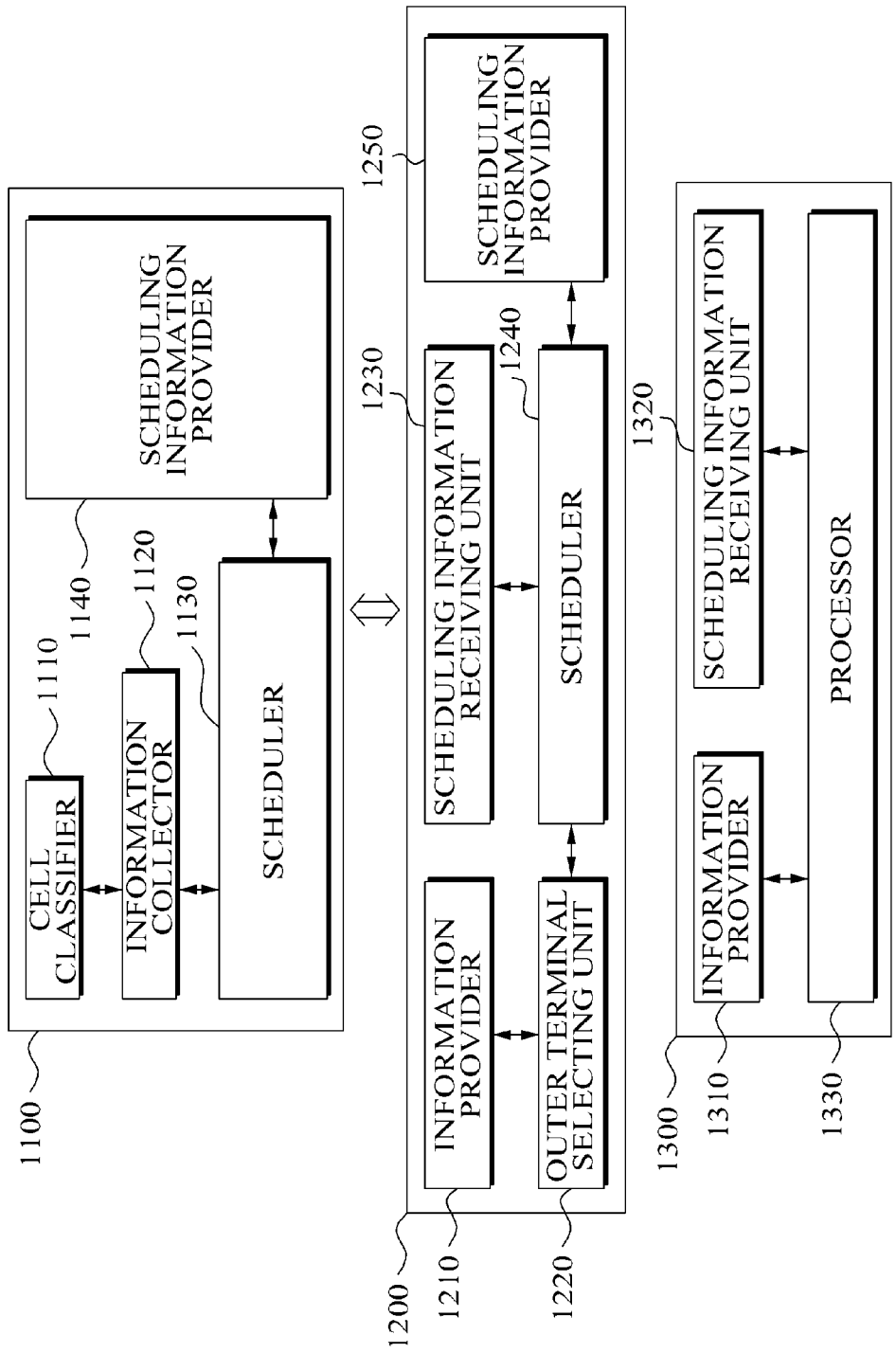
FIG. 11 is a block diagram illustrating an example of a communication device, a base station, and a terminal.

FIG. 11 is a block diagram illustrating an example of a communication device, a base station, and a terminal. Referring to FIG. 11, a communication device 1100 according to example embodiments includes a cell classifier 1110, an information collector 1120, a scheduler 1130, and a scheduling information provider 1140.

The cell classifier 1110 may classify a plurality of cells (e.g., cells 310, 320, 330 in FIG. 3) based on locations of a plurality of base stations (e.g., base stations BS1, BS2, BS3 in FIGS. 4A and 4B) included in a network (e.g., network 410, 420 in FIGS. 4A and 4B; network 500 in FIG. 5). Each of the plurality of cells may be divided into an inner cell and an outer cell.

Also, the information provider 1120 may collect channel information of outer terminals, mobility information of the outer terminals, information of a distribution of the outer terminals, and/or information of traffic occurring due to the outer terminals. The described information may be dynamically reflected while an outer cell frequency resource (e.g., resource F2) is scheduled.

Further, the scheduler 1130 may schedule outer cell scheduling information by scheduling the outer cell frequency resource for the outer terminals in the plurality of cells. Particularly, the scheduler 1130 may be assigned with a unique authority to schedule the outer cell frequency resource, from base stations. In this example, the scheduler 1130 schedules the outer cell frequency resource independent of inner cell frequency resource. Here, an amount of the outer cell frequency resource and a band of the outer cell frequency resource are adaptively adjustable.

The scheduler 1130 may use various scheduling methods. As an example, the outer cell frequency resource may be scheduled to minimize interference occurring among the outer terminals. Particularly, the scheduler 1130 may allow the plurality of base stations to use the interference alignment scheme.

In addition, the scheduler 1130 may maximize efficiency in using the outer cell frequency resource by appropriately assigning, to the outer terminals, a time resource, a frequency resource, and a spatial resource in the outer cell frequency.

Moreover, the scheduling information provider 1140 may provide the outer cell scheduling information to the plurality of cells. Providing of the outer cell scheduling information to the plurality of cells may indicate providing of the outer cell scheduling information to at least one of communication nodes, such as base stations, relay stations, and terminals included in the plurality of cells.

In addition, the base station 1200 may include an information provider 1210, an outer terminal selecting unit 1220, a scheduling information receiving unit 1230, a scheduler 1240, and a scheduling information provider 1250.

The information provider 1210 receives outer cell scheduling information relating to a scheduling result from the communication device 1100 that schedules outer cell frequency resource for outer terminals in an outer cell of a base station 1200.

Also, the outer terminal selecting unit 1220 may select the outer terminals from among terminals based on locations of the terminals in the outer cell of the base station 1200 and a strength of a signal received at the terminals.

Additionally, the scheduling information receiving unit 1230 may receive the outer cell scheduling information relating the scheduling result from the communication device 1100 that schedules the outer cell frequency resource for the outer terminals in the outer cell of the base station 1200.

Furthermore, the scheduler 1240 may generate scheduling information by scheduling inner cell frequency resource for inner terminals in an inner cell of the base station 1200.

Moreover, the scheduling information provider 1250 may provide the scheduling information to the outer terminals and the inner terminals.

Also, the terminal 1300 according to example embodiments may include an information provider 1310, a scheduling information receiving unit 1320, and a processor 1330.

When the terminal 1300 is any one of the outer terminals (e.g., terminals D, E, F, G, H, I), the information provider 1310 may provide, to the base station 1200, channel information of the terminal 1300 and/or mobility information of the terminal 1300.

The scheduling information receiving unit 1320 receives the scheduling information from the base station 1200. When the terminal 1300 is any one of the outer terminals, the outer cell scheduling information may be recognized based on the scheduling information, and when the terminal 1300 is any one of the inner terminals, the inner cell scheduling information may be recognized based on the scheduling information.

Also, the processor 1330 may process a reception signal and may generate a transmission signal, using a radio resource for a terminal, the radio resource being recognized based on the scheduling information.

According to examples of embodiments, a communication device for a multi-cell network may independently schedule an outer cell frequency resource for outer terminals in a plurality of cells, which may more maximize efficiency in using a frequency resource and may efficiently prevent inter-cell interference.

Additionally, according to example embodiments, a communication device for a multi-cell network may appropriately schedule and manage an outer cell frequency resource according to channel information, distribution information, and mobility information of outer terminals and an amount of traffic occurring due to the outer terminals, which may more maximize throughput.

Moreover, according to examples of embodiments, a base station for a multi-cell network may schedule an inner cell frequency resource by referring to outer cell scheduling information generated by a communication device, which may provide a scheduling result more optimal for all inner terminals and outer terminals.

Further, according to example embodiments, a terminal for a multi-cell network may use an optimal scheduling result, and may so communicate with a service base station in good quality.

Each cell in a wireless network may be divided into inner cells and outer cells based on locations of the cell and/or a strength of a signal that is received at a terminal in the cell. Terminals in each cell may be determined to be an inner terminal or an outer terminal based on in what type of cell it is located. Inner cells may be allocated a first frequency resource (e.g., frequency resource F1), and outer cells may be allocated a second frequency resource (e.g., frequency resource F2). Scheduling of resource usage for inner terminals in inner cells and scheduling of resource usage for outer terminals in outer cells may be performed independently.

A multi-cell network includes a communication device scheduling an outer cell frequency resource. A unique authority to schedule the outer cell frequency resource for outer terminals in a plurality of cells is assigned to the communication device, and an authority to schedule inner cell frequency resource for inner terminals is assigned to each of a plurality of base stations. The communication device schedules the outer cell frequency resource based on a status of the plurality of base stations, minimizing waste of a frequency resource and maximizing throughput of a network.

As an illustration, a terminal described above may be one of a cellular phone, a personal digital assistant (PDA), a digital camera, a portable game console, a portable multimedia player (PMP), a navigation console, and an MP3 player. The terminal may also be for home applications such as a high definition television (HDTV), an optical playback device, a setup box, and the like. The terminal (which is sometimes referred to as a computer terminal) may also be an electronic or electromechanical hardware device that is used to enter and/or display data such as a personal computer, a laptop, and the like.

A number of examples of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication device for a multi-cell network, the device comprising:
   an information collector configured to collect mobility information of each respective outer terminals, the mobility information comprising a speed that the outer terminals move;
   a scheduler configured to schedule an outer cell frequency resource to each of respective outer terminals in outer cells of a plurality of cells, to generate outer cell scheduling information and to schedule the outer cell frequency resource to each of the respective outer terminals based on the mobility information of the outer terminals, wherein the outer cell frequency resource is distinguished from an inner cell frequency resource of each of respective inner terminals in inner cells of the plurality of cells; and a scheduling information provider configured to provide the outer cell scheduling information to base stations in the plurality of cells.

2. The device of claim 1, wherein the scheduler comprises a unique authority to schedule the outer cell frequency resource to each of the respective outer terminals.

3. The device of claim 1, wherein the scheduler is further configured to:

schedule the outer cell frequency resource to each of the respective outer terminals based on interferences occurring between the outer terminals.

4. The device of claim 1, wherein the outer cell frequency resource is independent of an inner cell frequency resource of each of respective inner terminals in inner cells of the plurality of cells.

5. The device of claim 1, wherein the scheduler is further configured to:

assign, to each of the respective outer terminals, a time resource, or a frequency resource, or a spatial resource, or any combination thereof, as the outer cell frequency resource.

6. The device of claim 1, wherein the outer cell scheduling information comprises information to control transmission power of one or more of the outer terminals, and one or more of the base stations with respect to the outer terminals.

7. The device of claim 1, wherein the outer cell scheduling information comprises information to enable one or more of the outer terminals to use an interference alignment scheme.

8. The device of claim 1, further comprising:

an information collector configured to collect information with respect to a distribution of the outer terminals, or information with respect to traffic occurring due to the outer terminals, or any combination thereof, wherein the scheduler is further configured to schedule the outer cell frequency resource to each of the respective outer terminals based on the information with respect to the distribution of the outer terminals, or the information with respect to the traffic occurring due to the outer terminals, or any combination thereof.

9. The device of claim 1, further comprising:

an information collector configured to collect channel information of the outer terminals, or mobility information of the outer terminals, or any combination thereof, wherein the scheduler is further configured to schedule the outer cell frequency resource to each of the respective outer terminals based on the channel information of the outer terminals, or the mobility information of the outer terminals, or any combination thereof.

10. The device of claim 1, further comprising:

a cell classifier configured to classify the plurality of cells.

11. The device of claim 10, wherein the cell classifier is further configured to:

classify the plurality of cells based on locations of the base stations.

12. The device of claim 1, wherein the scheduler is further configured to:

adjust an amount of the outer cell frequency resource and a band of the outer cell frequency resource based on an amount of a frequency resource utilized by the outer cells, or a band utilized by the outer cells, or any combination thereof.

13. The device of claim 1, wherein the scheduler is further configured to:

adjust an amount of the outer cell frequency resource and a band of the outer cell frequency resource based on an amount of traffic occurring due to the outer terminals and a distribution of the outer terminals.

14. The device of claim 1, wherein the base stations are configured to select the outer terminals from terminals included in the plurality of cells based on locations of the terminals and a strength of a signal received at the terminals.

15. The device of claim 1, wherein the base stations are configured to serve the outer terminals based on the outer cell scheduling information.

16. The device of claim 1, wherein the base stations are configured to schedule an inner cell frequency resource to each of respective inner terminals in inner cells of the plurality of cells.

17. The device of claim 1, wherein the communication device is established in at least one node from among nodes included in the plurality of cells, respectively, or is established in a node independent from the nodes.

18. A base station for a multi-cell network comprising a plurality of cells, the base station comprising:

a scheduling information receiving unit configured to receive outer cell scheduling information relating to a scheduling result from a communication device, the communication device configured to schedule an outer cell frequency resource to each of respective outer terminals in outer cells of the plurality of cells, to generate the outer cell scheduling information and to schedule the outer cell frequency resource to each of the respective outer terminals based on mobility information of the outer terminals, wherein the communication device includes an information collector configured to collect the mobility information of each respective outer terminals, the mobility information comprising a speed that the outer terminals move; and a scheduler configured to schedule an inner cell frequency resource to each of respective inner terminals in an inner cell of the base station, to generate the scheduling information based on the outer cell scheduling information.

19. The base station of claim 18, further comprising:

an information provider configured to provide, to the communication device, channel information of the outer terminals or mobility information of the outer terminals, or any combination thereof in response to the communication device performing the scheduling.

20. The base station of claim 18, further comprising:

an information provider configured to provide, to the communication device, information with respect to a distribution of the outer terminals, or information with respect to traffic occurring due to the outer terminals, or any combination thereof, wherein the communication device is further configured to schedule the outer cell frequency resource to each of the respective outer terminals based on the information with respect to the distribution of the outer terminals, or the information with respect to traffic occurring due to the outer terminals, or any combination thereof.

21. The base station of claim 18, further comprising:

an outer terminal selecting unit configured to select the outer terminals from among terminals in outer cells of the base station based on locations of the terminals, or a strength of a signal received at the terminals, or any combination thereof.

22. The base station of claim 18, further comprising:
a scheduling information provider configured to provide the scheduling information to the outer terminals and the inner terminals.

23. The base station of claim 18, wherein:
the communication device comprises a unique authority to schedule the outer cell frequency resource to each of the respective outer terminals; and
the base station comprises a unique authority to schedule the inner cell frequency resource to each of the respective inner terminals.

24. The base station of claim 18, wherein the base station is configured to assign radio resources to serve the outer terminals and the inner terminals based on the scheduling information.

25. A terminal for a multi-cell network, the terminal comprising:
a scheduling information receiving unit configured to receive scheduling information from a serving base station; and
a processor configured to process a received signal and to generate a transmission signal, using a radio resource of the terminal, the radio resource being recognized based on the scheduling information,
wherein a communication device is configured to schedule an outer cell frequency resource to each of respective outer terminals in outer cells of a plurality of cells, to generate outer cell scheduling information and to schedule the outer cell frequency resource to each of the respective outer terminals based on the mobility information of the outer terminals,
wherein the communication device includes an information collector configured to collect the mobility information of each respective outer terminals, the mobility information comprising a speed that the outer terminals move, and
wherein the serving base station is configured to schedule an inner cell frequency resource to each of respective inner terminals in an inner cell of the serving base station, to generate the scheduling information based on the outer cell scheduling information.

26. The terminal of claim 25, wherein:
in response to the terminal being one of the outer terminals, the communication device is configured to schedule the outer cell frequency resource to the terminal, as the radio resource of the terminal; and
in response to the terminal being one of the inner terminals, the communication device is configured to schedule the inner cell frequency resource to the terminal, as the radio resource of the terminal.

27. The terminal of claim 25, wherein the processor is further configured to:
use an interference alignment scheme based on the scheduling information.

28. The terminal of claim 25, wherein the processor is further configured to:
control a transmission power of the terminal.

29. The terminal of claim 25, further comprising:
an information provider configured to provide, to the serving base station, channel information of the terminal, or mobility information of the terminal, or any combination thereof in response to the terminal being one of the outer terminals,
wherein the communication device is further configured to schedule the outer cell frequency resource to each of the respective outer terminals based on the channel information of the terminal, or the mobility information of the terminal, or any combination thereof.

30. The terminal of claim 25, wherein the serving base station is further configured to determine the terminal to be one of the outer terminals or the inner terminals based on a location of the terminal, or a strength of a signal received at the terminal, or any combination thereof.

31. A method of operating a communication device for a multi-cell network, the method comprising:
collecting mobility information of each respective outer terminals, the mobility information comprising a speed that the outer terminals move;
scheduling an outer cell frequency resource to each of respective outer terminals in outer cells of a plurality of cells, to generate outer cell scheduling information and scheduling the outer cell frequency resource to each of the respective outer terminals based on the mobility information of the outer terminals,
wherein the outer cell frequency resource is distinguished from an inner cell frequency resource of each of respective inner terminals in inner cells of the plurality of cells; and
providing the outer cell scheduling information to base stations in the plurality of cells.

32. A method of operating a base station for a multi-cell network, the method comprising:
receiving outer cell scheduling information relating to a scheduling result from a communication device, the communication device scheduling an outer cell frequency resource to each of respective outer terminals in outer cells of a plurality of cells, to generate the outer cell scheduling information and scheduling the outer cell frequency resource to each of the respective outer terminals based on mobility information of the outer terminals,
wherein the communication device includes an information collector configured to collect the mobility information of each respective outer terminals, the mobility information comprising a speed that the outer terminals move; and
scheduling an inner cell frequency resource to each of respective inner terminals in an inner cell of the base station, to generate the scheduling information based on the outer cell scheduling information.

33. A non-transitory computer-readable storage medium storing a program implementing the method of claim 31.

34. A communication device for a multi-cell network, the device comprising:
an information collector configured to collect mobility information of each respective outer terminals, the mobility information comprising a speed that the outer terminals move;
a scheduler configured to schedule an outer cell frequency resource to each of respective outer terminals in outer cells of a plurality of cells, to generate scheduling information for the plurality of cells, a same first frequency resource being assigned to inner cells of the plurality of cells, and a same second frequency resource being assigned to the outer cells of the plurality of cells and to schedule the outer cell frequency resource to each of the respective outer terminals based on the mobility information of the outer terminals,
wherein the outer cell frequency resource is distinguished from an inner cell frequency resource of each of respective inner terminals in inner cells of the plurality of cells; and a scheduling information provider configured to provide the scheduling information to base stations in the plurality of cells.

35. The device of claim 1, wherein the scheduler is further configured to:
assign, to each of the respective outer terminals, a time resource and a frequency resource, as the outer cell frequency resource.

36. The device of claim 1, wherein:
the outer cell frequency resource is distinguished from an inner cell frequency resource of each of respective inner terminals in inner cells of the plurality of cells; and
the scheduler is further configured to adjust an amount of the outer cell frequency resource and a band of the outer cell frequency resource based on an amount of a frequency resource utilized by the outer cells, or a band utilized by the outer cells, or any combination thereof.

* * * * *